United States Patent [19]
Doherty et al.

[11] Patent Number: 5,607,716
[45] Date of Patent: Mar. 4, 1997

[54] USE OF HYDROCOLLOIDS FOR FORMULATING AND PROCESSING OF LOW FAT LOW WATER ACTIVITY CONFECTIONERY PRODUCTS AND PROCESS

[75] Inventors: Cheryl A. Doherty, Hummelstown; Philip C. Ward, Palmyra, both of Pa.

[73] Assignee: Hershey Foods Corporation, Hershey, Pa.

[21] Appl. No.: 408,693

[22] Filed: Mar. 21, 1995

Related U.S. Application Data

[63] Continuation-in-part of Ser. No. 694,099, May 1, 1991, abandoned.

[51] Int. Cl.$^6$ ....................................................... A23G 3/00
[52] U.S. Cl. ........................ 426/660; 426/572; 426/573; 426/575; 426/658
[58] Field of Search ................................ 426/548, 573, 426/601, 660, 661, 549, 564, 572, 575, 576, 658, 659

[56] References Cited

U.S. PATENT DOCUMENTS

| | | |
|---|---|---|
| 3,493,383 | 2/1970 | Ryan et al. . |
| 3,849,395 | 11/1974 | Molrano . |
| 3,867,650 | 2/1975 | Menzi et al. . |
| 4,140,807 | 2/1979 | Braverman . |
| 4,292,337 | 9/1981 | Andersen . |
| 4,326,052 | 4/1982 | Kang et al. . |
| 4,326,053 | 4/1982 | Kang et al. . |
| 4,410,552 | 10/1983 | Gaffney et al. . |
| 4,564,525 | 1/1986 | Mitchell et al. . |
| 4,601,907 | 7/1986 | Knebl et al. . |
| 4,637,937 | 1/1987 | Terada et al. . |
| 4,698,232 | 10/1987 | Sheu et al. . |
| 4,704,293 | 11/1987 | Moore et al. . |
| 4,710,393 | 12/1987 | Holmgren et al. . |
| 4,948,615 | 8/1990 | Zallie et al. . |
| 4,956,193 | 9/1990 | Cain et al. . |
| 5,158,800 | 10/1992 | Bell . |

FOREIGN PATENT DOCUMENTS

| | | |
|---|---|---|
| 0285187 | 5/1988 | European Pat. Off. . |
| 0273001 | 6/1988 | European Pat. Off. . |
| 2912411 | 10/1980 | Germany . |
| 63-248346 | 10/1988 | Japan . |
| 1538750 | 6/1979 | United Kingdom . |

OTHER PUBLICATIONS

Technical Bulletin entitled "Confectionery Jellies with Kelcogel CF Gellan Gum Product".

*Primary Examiner*—Leslie Wong
*Attorney, Agent, or Firm*—Scully, Scott, Murphy & Presser

[57] ABSTRACT

A low or no fat confection is prepared containing 80% soluble solids wherein at least 70% of the solids are carbohydrates. The mixture containing carbohydrate, a cationic reactive and thermosensitive hydrocolloid and an edible cation containing material is cooked or its solids concentration adjusted to 80% solids while hot. The molten mixture is then cooled to form a solid confection having a water activity being 0.30 to 0.65 Aw and a pH from 3.0 to 8.5.

44 Claims, No Drawings

USE OF HYDROCOLLOIDS FOR FORMULATING AND PROCESSING OF LOW FAT LOW WATER ACTIVITY CONFECTIONERY PRODUCTS AND PROCESS

This is a continuation-in-part of patent application Ser. No. 694,099, filed May 1, 1991 now abandoned.

This invention relates to low or no fat confectionery and more particularly to such confectionery items having reduced water activity, an acid to neutral pH, good flavor and texture. The invention is particularly suitable for preparing low fat or no fat confections such as caramel.

DESCRIPTION OF THE PRIOR ART

It is desirable to reduce the fat content of foods and to extend shelf life while retaining the full taste and texture thereof. Inasmuch as shelf life is related to its water activity, the objective is to produce a low fat confectionery product which has a high solid content and a low moisture content and Vet, still possesses the water activity of proper value to prolong the shelf life thereof. In addition it is desirable to produce a quick-setting solid non-flowable product that can be made into an enrobable confectionery product.

Chocolate confectionery products often contain 20% or more fat while caramel and fruit flavored confectioneries often contain 10% or more fat. Shelf life of such products can be increased by increasing the soluble solids content of the food thus lowering the water activity (Aw) of the food. Numerous high sugar products have been formulated often including monosaccharides and polyols to reduce the water availability in the food to microorganisms.

However, these products often suffer from flavor and texture problems. Polyhydric alcohols contribute undesirable tastes to the confection but are needed to suppress water activity. Often the sugar content produces excess sweetness, thickness, and rigidity to the product. A high level of fat in confectionery products in addition to being of concern to many diet conscious consumers also results in products having poor shelf stability. However, the fat content of confectionery products is often maintained at a high level because it imparts lubrication for machining and cutting during candy manufacture, provides excellent mouth feel, flavor and stand up body. In addition, when emulsified, fat tends to inhibit crystallization and fat also imparts a sense of satiety after the product has been consumed.

A caramel composition of good flavor and soft texture is disclosed in U.S. Pat. No. 4,710,393 to Holmgren et al., issued Dec. 1, 1987 which employs a major amount of a blend of dextrose and fructose in the caramel and a moisture content of about 4% to about 10% which gives a water activity of 0.2 to about 0.5 Aw. In UK 1,538,750 to Jeffery, published Jan. 24, 1979, there is disclosed an over 20% fat containing chocolate product containing a gum (gelatin or gum arabic) which is employed to prevent fat separation from the product.

Terada et al. in U.S. Pat. No. 4,637,937 disclose, inter alia, a chocolate emulsion comprising 5 to 35% oil, 3–30% chocolate, 10–30% sugar, 2–6% defatted milk solids, 0.05–3% stabilizer and solid content of 40%–60%. Therefore, the moisture content of the product of Terada et al is 60%–40%, respectively, which is quite high. Thus, the confections of Terada, et al. produce a chocolate emulsion having a high water activity and thus are not suitable for storing for a prolonged period of time.

U.S. Pat. No. 3,867,560 to Menzi et al. discloses a confectionery comprising 35–60% carbohydrate, 1–45% proteins which are soluble at pH 6.2–7.5, 12–20% of a gelling protein or gelling carbohydrate and 4–24% by weight water. The product formed therefrom is a paste. The amount of hydrocolloid used is quite large as it is used for the purpose of thermally setting the paste. Confections produced by Menzi et al. do not produce a homogenous non-flowing solid which can be made into an enrobable confectionery product, a goal of the present invention.

The present inventors have developed a low or no fat confectionery product which can be stored without refrigeration for a long period of time, has the proper water activity, is homogenous, and is a quick-setting solid non-flowable product. The present inventors have found the proper ingredients, including the hydrocolloids, to be used in the product to impart these characteristics thereto.

The hydrocolloids used herein are widely employed in foodstuffs including confectionery products and jellies. Gellan is used in fruit based bakery fillings, icings, frostings, glazes, jams and jellies. Carrageenan is widely used in milk and water desserts.

SUMMARY OF THE INVENTION

We have discovered fast setting, temperature resistant, acidic but particularly neutral pH confectionery products or items having good flavor and soft texture even though the fat content of these confectionery products or items has been substantially lowered or eliminated. We have modified the confection by reducing the fat content and by adding a hydrocolloid which forms a gel which has cation and temperature solids content of the confection from 80% or more solids. Carbohydrates comprise at least 70% of the total solids. In many cases we employ high fructose corn syrup, invert sugar or dry fructose so that the fructose concentration based on total solids is greater than 40%. For low calorie confectionery products or items, up to 40% of the carbohydrate can be low calorie bulking agents and at least 30% of the carbohydrate can be monosaccharides. This adjustment of carbohydrate concentration and the type of material employed provides a confection having the desired calorie content and a water activity below 0.65 Aw.

DESCRIPTION OF THE INVENTION

We prepare a confection having a total solid content of 80% or more, preferably from 80% to 90% total solids and most preferably from 84° to 89° brix or percent solids. The carbohydrate content of the total solids is at least 70% of the solids. The carbohydrates can be mono, di and poly saccharide, sugar alcohols, cellulose and cellulose derivatives and extracts, gums and the like. In making good tasting low calorie confectionery products or items, we can employ up to 40%, preferably 10–40%, of the carbohydrate content of low calorie bulking agents such as polydextrose, sugar alcohols, cellulose, cellulose derivatives and extracts and gums with at least 30% of the carbohydrate content being monosaccharides. Where calorie reduction is accomplished using fat reduction primarily, we can employ mono and disaccharides with fructose being at least 30% of the carbohydrate content.

The particular carbohydrates employed can be any combination that meets the caloric target and water activity of 0.30 to 0.65 Aw and does not cause crystallization in the final product.

Water activity is a measurement of the amount of water available for chemical reactions in foods, e.g., browning, enzyme activity, microbiological spoilage, hydration of colloids, and the like. It is a measurement of the free water available for chemical reactions. A higher water activity signifies that more free water is available, while a lower water activity indicates less free water is available. Obviously, the water activity is related to the amount of water present in the food, but the relationship is quite complex and non-linear. In addition, water activity is dependent upon other factors, such as the amount and type of solids present in the food and the interaction of the solids with the water. Thus, even if two foods contain the same moisture content, the water activity would be different if the solid composition of the foods are different.

It is important to maintain the water activity below a certain level. Molds grow on food with water activity greater than 0.70, yeasts grow at water activity above 0.8 and bacteria grows on food having water activity greater than 0.9. It is preferred that the water activity is below 0.65. It is more preferred that the water activity ranges from 0.30 to 0.65 inclusive. It is even more preferred that the water activity ranges from 0.30 to 0.45, inclusive.

When using monosaccharides, fructose is employed for its sweetness and Aw lowering with the balance of the sugar solids usually dextrose. We use high fructose corn syrup of 55% or 90% fructose content or invert sugar which is commercially available to adjust the fructose concentrations. 100% crystalline fructose can also be used. Suitable sugars, including sucrose, maltose, lactose and the like, can be employed as part of our sugar solids, although we prefer to employ fructose and dextrose. Suitable monosaccharides include fructose, dextrose and various high conversion corn syrups. Suitable disaccharides include sucrose.

The low calorie bulking agents include suitable polysaccharides including polydextrose sugar alcohols such as sorbitol, mannitol, xylitol and the like, cellulose such as AVICEL® (i.e., microcrystalline cellulose) and other commercially refined edible products, cellulose derivatives and extracts such as carboxymethyl cellulose, methyl cellulose, hydroxy propyl methyl cellulose, hydroxypropyl cellulose and mixtures thereof, SOLKA-FLOC® (i.e., powdered cellulose), curdlan, OATTRIM® (i.e., β-glucon-rich fraction extracted from oak fiber), FIBERSOL® #2 (i.e., polydextrose), FIBERCEL® (i.e., yeast-derived β-glucon fiber), and the like, and gums such as xanthan, guar, pectin, locust bean gum, alginates, agar-agar, carrageenans, gum acacia, tara gum, karaya gum, furcellaran, tragacanth, ghatti and the like.

When using cellulose, we prefer to employ from 1–10% and more preferably 1–5% as a means of reducing calories but also for its fat mimetic properties when employed at small particle sizes of 0.1 to 20 microns, preferably 0.1–3 microns. In fact any finely derived insoluble carbohydrate or protein of 0.1–20 microns preferably 0.1–3 microns can also be employed at up to 40% of the solids content of the confectionery for its fat mimetic properties.

Up to 10% of the carbohydrate content of the confectionery product can be substituted for by protein. Proteins can be of an acceptable food source and can be unmodified or modified through the use of processing, enzymes or food grade chemicals. Particular proteins include zein, caseins, egg albumin, whey proteins, soy protein isolates, hydrolyzed proteins and the like.

We use a hydrocolloid which is both cationic reactive and thermosensitive. The term "thermosensitive" as used herein means a quick-setting (e.g., within minutes), solid, non-flowable product. Said product can be molded into shape when hot but will quickly set upon cooling in a matter of minutes. Once cool, the products can be demolded for packaging or cut into strips for enrobing with chocolate, etc. The cooled product can also be reheated and remolded and allowed to quick set into different shapes. In other words, the hydrocolloids useful in the present invention are thermo reversible.

Further, as used herein, the term "cationic reactive" signifies that the hydrocolloid is capable of reacting with a cation, i.e, the hydrocolloid is capable of forming a gel with a cation edible material, as defined herein below. It is preferred that the hydrocolloid forms a gel which has both cation and temperature sensitive properties. The hydrocolloids used herein are therefore present in quantities sufficient to form a gel with the cation containing edible material described hereinbelow.

It is to be noted that various hydrocolloids are known in the art, but the present inventors have found that only a few hydrocolloids possess the proper characteristics necessary at the specific water activity and water content moisture required of the present invention. These cationic reactive thermosensitive hydrocolloids include linear, high molecular weight polysaccharides particularly the anionic variety such as carrageenan, furcellaran, gellan, agar and the like. These materials are capable of being dispersed and hydrated in hot 80% soluble solids confectionery products or items having acidic or neutral pH ranging from pH 3.0 to 8.5. Acid confectionery products or items would be the fruit flavor variety. We prefer to make neutral products such as caramels and chocolates having pH from 5.5 to 8.5. The thermosensitive hydrocolloid on cooling solidifies. By using the linear, high molecular weight polysaccharides such as gellan and carrageenan, we are able to form gels with an appropriate cation containing edible material which on cooling set or gel into the desired high solids confectionery texture. It is the cationic reactiveness and thermosensitivity of our hydrocolloid gels which develop the desired confectionery texture when employed at 80% or greater soluble solids content and fat contents below 7%. The hydrocolloid used in this invention is also set or solidified in less than 30 minutes preferably in 20 minutes or less and often almost instantaneously as with carrageenan, when the high solids confectionery temperature is lowered.

Suitable hydrocolloids include the various carrageenans such as kappa carrageenan, iota carrageenan and lambda carrageenan and mixtures thereof, mixtures of carrageenan and locust bean gum, furcellaran, agar and gellan. Kappa carrageenan, iota carrageenan, furcellaran, gellan and agar are the preferred hydrocolloids. Carrageenan, especially kappa carrageenan, iota carrageenan, furcellaran and gellan are most preferred. From 0.25% to 3.5%, preferably 0.4% to 0.8% by weight of the carrageenans, both kappa and iota, and mixtures thereof are employed with a suitable cation containing edible material such as milk solids, cocoa, potassium or calcium salts or other cation source. From 0.5% to 5%, preferably 0.75% to 3% by weight gellan is employed with from 0.1% to 0.5% citrate or other organic acid salt. It is preferred that from 0.25% to 3.5% and most preferably 0.4% to 0.8% by weight of furcellaran is utilized. If agar is present, it is preferred that from 0.25% to 3.5% and most preferably from 0.4% to 0.8% by weight is utilized.

Gellan is useful for its brittle gel, clean flavor release and is stable over a broad pH range while carrageenan is useful for its chewable gel texture and very quick setting properties. Carrageenan also offers a wide range of viscosity at various temperatures. The hydrocolloids used herein are heat dispersible and resulting gels may be pumpable and/or shear reversible. The gels immediately set or gel within 20 minutes below 180° F. and can produce textures ranging from a very firm gel to a soft spreadable gel suitable for molding, enrobing or incorporating into a confection such as a multi-component candy bar. Suitable cationic reactive and thermosensitive hydrocolloids can be employed. The texture of the gel can be adjusted by changing the concentration of the hydrocolloid, by selection of the appropriate individual mixtures of hydrocolloid, by changing the concentration of the cation containing edible material or by using one or more cations in the formula, and by adjusting pH of the formula.

We believe we are the first to discover that high solids 80% or more confectionery products or items can be chemically set particularly at neutral pH of 5.5 to 8.5. Where desired, non-cationic reactive hydrocolloids may be employed in minor amount (less 30%) to further modify the texture of the confectionery.

The fat content of the confectionery can vary from 0–20% for chocolate products, and 0–7% for fruit flavored and caramel products. However, in most cases we prefer to employ less than 7% fat in our products. We employ those fats including oils normally employed in confectionery products or items such as milk fat, cocoa butter, hydrogenated vegetable oil and butter.

Minor additives are employed such as emulsifiers like lecithin, mono and diglycerides and polysorbates at a concentration of from 0% to 10%; salt at from 0% to 2.5%, flavors and colors. We also can employ normal texturizing agents combined with our confectionery such as nuts, nougats, marshmallow, chocolate bits, coconut and the like.

We may also employ crispy bakery products and cereals like rice, puffed cereal, cookies, crackers and the like. The Aw of our confection reduces transfer of moisture to the drier baked or cereal items. With little or no moisture transfer between the various components of the confection there is little or no change in the texture of any components of the confection. Aw control provides for chewy and crisp components in the confection having good texture for a long period of storage. There is also less tendency for the confection to dry out during storage. The low water activity also reduces the ratio of formation of off colors and flavors, reduces undesired browning, nutrient degradation, rancidity of fats and enzymatic reactions.

The cation containing edible material can be dairy products or other conventional confectionery ingredients which contain sufficient cations to react with the anionic polysaccharide and form a gel. Cation containing edible material include from 5% to 15% milk solids by weight, 0 to 10% cocoa by weight, 0 to 30% fruit juice by weight, 0 to 20% fruit solids by weight or any food grade acceptable cations, including the metal cations. The food grade cations include the edible cations of Groups IA, IIA and IIIA of the periodic table and especially Group I and IIA. Examples include potassium, sodium, ammonium, magnesium, calcium and the like. The preferred edible cations are salts of calcium or potassium such as potassium chloride, calcium lactate, calcium chloride and the like. The food grade cations are present in 0–5% concentration preferably less than 2.5% by weight.

The confectionery of this invention is stable because of its low fat content and high solid gel. Excellent chocolate and caramel low fat, neutral pH, fillings are possible for use in candy bars or per se.

The confection of this invention can be prepared in a number of ways. A concentrated solution of gelling agent and water can be prepared at a temperature high enough to prevent gelling. The gelling solution can be added into a hot mixture (180° F.) of the remaining ingredients with through mixing, often cooked to the desired solids content and cooled in molds or slabs until set. Alternatively, a blend of liquified corn syrup and dry sugars can be prepared and heated to 140° F. The dry gelling agent and further sugar is blended into the hot corn syrup. This hot mixture is transferred to a blender and the other ingredients such as milk solid, cocoa, salt and fat are added. The resulting mixture may be cooked to adjust solids content if necessary and is cast in molds or as a slab and allowed to cool and set. Alternatively, the gelling agents can be dispersed in water or a low solid liquid dairy product such as evaporated skim milk using shear at room temperature. The remaining ingredients are mixed into the dispersion and the mixture cooked and evaporated to the desired solids and flavor. The cooked mixture can be poured into molds or slabs and allowed to cool until set.

In general the hydrocolloid is dispersed in a hot state and mixed with other ingredients including an edible cation source and the solids content adjusted by addition of solids or removal of water until the desired taste and solids content is reached. At that time the mixture is cast and cooled to form the finished confectionery.

The confectionery may be used with other food ingredients in making enrobed candy products such as chocolate, caramel or fruit flavored bars. For example a layer of a baked wafer of high solids, low sugar content in rectangular form may be covered with a layer of nougat or fruit jam, another baked wafer, a caramel layer using the product of this invention, nuts mixed in the caramel or as a separate layer and a final baked wafer. The layered food is then enrobed with chocolate. The caramel or chocolate of this invention may comprise from 15–70% and preferably 20–50% of the bar.

When utilizing wafers, it is preferred that the water activity of the confectionery product be 0.45 or less and more preferably 0.40 or less. The confections containing the formulations described herein above are compatible with wafers, especially when the water activity is within the above identified ranges; and thus, there formulations can enrobe the wafer. Thus, these products have acceptable shelf-life, which is in sharp contrast with products having high water activity, which tend to make the wafer soggy and soft and which tend to shorten its shelf life.

The confectionery may also be shaped to make conventional caramel products and other attractive candies.

It is to be understood, unless specified to the contrary, that the percentages used herein are by weight.

The following examples are illustrative of the present invention.

EXAMPLE 1

A typical caramel product is prepared from the following ingredients:

| Ingredient | Chocolate, Caramel % | Regular Caramel % |
| --- | --- | --- |
| Non-fat milk solids | 7.1 (5–10%) | 7.5 (5–10%) |
| High fructose corn syrup (23% $H_2O$; 55% fructose) | 58.0 (28%–70%) | 58.0 (28%–70%) |
| Carrageenan | 0.4 (.25–2.5%) | 0.45 (.25–2.5%) |

-continued

| Ingredient | Chocolate, Caramel % | Regular Caramel % |
|---|---|---|
| Salt | 0.35 | 0.35 |
| Cocoa | 4.0 (2.0–7%) | 0 |
| Water | 27.65 (0–45%) | 31.2 (0–45%) |
| Fat (butter) | 2.0 (0–6.9%) | 2.0 (0–6.9%) |
| Emulsifier | 0.5 (0–10%) | 0.5 (0–10%) |
| Total | 100.00 | 100.00 |

The carrageenan is hydrated and dispersed in a solution of the non-fat milk solids and water using vigorous agitation at room temperature. The remaining ingredients are added and the mixture heated to cook and evaporate water until a solids content of 85% is reached at a temperature of 242° F. The hot mixture is then combined with other ingredients and cooled to form a confectionery. The caramel is characterized by a desirable chewy texture, low water activity of 0.30 to 0.65 Aw, a solids content of at least 80° brix and a pH of 5.5 to 8.5.

The candy bar is prepared by baking high solids, low sugar wafers. A rectangular wafer is covered by a layer of nougat, another wafer, a layer of caramel prepared as in Example 1, a layer of ground nuts, and a wafer. The entire layer mass is enrobed with chocolate to form a candy bar containing 20–35% caramel.

Peanuts are finely ground and mixed into the caramel of example 1 to make a variant candy bar. The nougat can be replaced by fruit filling or jam. The wafers can be spiced and coated with white chocolate. Numerous variations are possible.

The carrageenan employed above can be replaced with 3% gellan (0.5 to 5%) with from 0.1–0.5% organic acid salt such as sodium citrate to give excellent products.

EXAMPLE 2

A stock solution was prepared of 4 parts gellan, 95.7 parts water and 0.3 parts by weight sodium citrate. The solution was heated to boiling to hydrate the gellan and held at 180°–190° F. 100 grams of the solution were combined with 400 grams of 79% fructose solution mixed well and the mixture cooled. The solution 85 brix, pH 5.15 containing about 0.8% gellan slowly solidified into a smooth, hard to cut gel.

When 2 millimolar calciumchloride was added with the fructose there was some pregelling. On cooling the 86° brix pH 4.54, approximately 0.4% gellan (50 g 4% solution added to 450 g 79% fructose) mixture there was obtained a grainy, very strong, clear, orange gel.

EXAMPLE 3

100 grams of a 4% gellan solution was mixed with 400 grams of Lycasin (75° brix).

250 grams of the mixture was heated to boiling and cooked to 81° brix and combined with 2 millimolar calcium chloride to give a grainy, slightly yellow, very hard, clear gel on cooling. Some pregelling was noted.

EXAMPLE 4

| | Caramel % |
|---|---|
| Corn Syrup | 20.37 |
| Invert or HFCS | 33.35 |
| Sweet Condensed Whole Milk | 31.57 |
| Margarine | 2.73 |
| Vegetable fat flakes | 5.70 |
| Lecithin | 0.12 |
| Sugar | 5.14 |
| Salt | 0.24 |
| Gellan | 0.75 |
| Sodium citrate | 0.30 |
| | 100.00 |

Dry blend the gellan and sugar. Add that mixture to the corn syrup and milk. Next add lecithin and the vegetable fat. Cook to about 254° F. The final cooked material, 83° brix, pH 5.95 gelled to a good texture on cooling. The confectionery was useful for enrobing and attachment of food particles. For example, an apple was dipped into the caramel which was then rolled in nuts which adhered to the caramel coating to make a tasty caramel candied apple.

EXAMPLE 5

| | % |
|---|---|
| Corn Syrup (42DE) | 10.37 |
| Invert Sugar | 43.30 |
| Condensed Milk | 33.35 |
| Butter | 2.73 |
| Fat-flakes (Paramount brand) | 5.70 |
| Lecithin | 0.12 |
| Sugar | 5.14 |
| Salt | 0.24 |
| Gellan | 0.75 |
| Sodium citrate | 0.30 |
| | 100.00 |

Heat the corn syrup, invert sugar, and condensed milk to 140° F. Add the dry ingredients as a blend and heat to boiling. Add the fat flakes and lecithin and boil for one minute. Add the butter and boil for one minute. The mixture (86° brix, pH 5.86) was cooled to form a good gel with a shorter slight sticky texture and a good color.

EXAMPLE 6

| | "No" Fat Caramel % |
|---|---|
| Evaporated Skim Milk | 36.55 |
| Disodium phosphate | 0.06 |
| High fructose corn syrup (55% fructose) | 61.04 |
| AVICEL ® cellulose | 1.0 |
| Iota-kappa blend of carrageenan) | 0.2 |
| Butter Flavor | 0.15 |
| Salt | 0.5 |
| Lecithin | 0.2 |
| ATMUL ® (mono- and diglycerides) | 0.3 |
| | 100.00 |

Disperse the cellulose in corn syrup (adjusted to pH 7.06). Hydrate the carrageenan in milk. Mix the corn syrup and milk mixtures together and blend in the cocoa using a blender by adding in small amounts. Heat to boiling in a steam kettle. Add butter, lecithin and Atmul to the boiling mixture. Cook until 245.5° F., 87% solids.

Residual fat in the skim milk, butter base, lecithin and Atmul resulted in 0.7% fat in the 57% solids mixture.

The product was a very good "no" butter caramel. It is difficult to tell the differences between this product and a 10% fat containing caramel.

EXAMPLE 7

|  | Chocolate Caramel % |
|---|---|
| Evaporated skim milk | 34.69 |
| Disodium phosphate | .01 |
| High fructose corn syrup | 57.16 |
| Butter | 2.0 |
| Cocoa | 4.0 |
| AVICEL ® | 1.0 |
| Water | 0.3 |
| VISCARIN ® GP 328 carrageenan | 0.35 |
| Lecithin | 0.19 |
| ATMUL ® (emulsifier) | 0.3 |
|  | 100.00 |

Disperse the AVICEL® in the corn syrup and disperse and hydrate carrageenan in the milk, Add the mixtures together, Next dissolve disodium phosphate in water and add to the dispersion, Blend in cocoa solids to the dispersion and add lecithin and ATMUL®. Heat the mixture to 110° F. to melt the lecithin and atmul, Cook mixture to 245° F., 87.85% solids, water activity 0.49.

EXAMPLE 8

|  | % |
|---|---|
| Evaporated skim milk | 34.86 |
| Disodixun phosphate | 0.01 |
| High fructose Corn Syrup | 58.24 |
| Butter | 4.0 |
| AVICEL ® | 1.0 |
| Water | 0.3 |
| Kappa-iota carrageenan blend | 0.6 |
| Salt | 0.5 |
| Lecithin | 0.19 |
| Atmul (emulsifier) | 0.3 |
|  | 100.00 |

Cook in a kettle as previously to 89.3% solids, 5.7% fat. The hot mix is very fast gelling (less than 1 minute) and was molded into the shape of bears and beans.

Chocolate and lemon bars were made following the layering procedure set forth in Example 1.

While we have described our confection in terms of caramel and chocolate caramel, the advantages of this invention can be applied to other normally fat containing confectionery material such as fudges, nougats, toffee, creams, gums, jellies and other water based confections.

EXAMPLE 9

The procedure of Example 1 was repeated, except the hydrocolloids used therein were substituted for the hydrocolloids listed in Samples 2–15 of the following Table. Except for certain cases described hereinbelow a 1:1 substitution was made at 0.4% for the kappa carrageenan used in Example #1 of the instant application. When type B gelatin, carob bean gum, carob meal or combination were used, concentrations representing the high and low ends of the ranges suggested by Menzi et al. in U.S. Pat. No. 3,867,360 were utilized. Sample 1 in Table 1 corresponds to example 1 of the present application. The results are tabulated in Table 1.

TABLE 1

| Sample | Hydrocolloid Used | Concentration | Aw | Comments |
|---|---|---|---|---|
| 1 | Kappa carr. | 0.4 | 0.226 | cutable, firm set, no flow |
| 2 | Gelatin (B) | 0.11 | 0.459 | grainy, ppt present |
| 3 | Gelatin (B) | 1.7 | 0.358 | strong, elastic, chewing set |
| 4 | Carob bean gum | 0.33 | 0.430 | grainy, ppt present |
| 5 | Carob meal/ gelatin | 1.0/0.07 | 0.570 | grainy, ppt presen |
| 6 | Carob meal/ gelatin | 0.07/1.0 | 0.480 | grainy, pulpy texture |
| 7 | Carob meal/ gelatin | 10.0/1.0 |  | grainy, powdery, no set |
| 8 | Lambda carr. | 0.4 | 0.438 | soft, chewy, no set |
| 9 | Iota carr. | 0.4 | 0.436 | chewy, elastic, cutable set |
| 10 | LM Pectin | 0.4 | 0.446 | firm, sticky, no set |
| 11 | HM Pectin | 0.4 | 0.405 | soft, cutable, no set |
| 12 | Xanthan | 0.4 | 0.311 | thick, long texture, no set |
| 13 | Guar gum | 0.4 | 0.528 | lumpy, syneresis, no set |
| 14 | Gum arabic | 0.4 | 0.363 | soft, no set |
| 15 | Agar-agar | 0.4 | 0.366 | short texture, suitable set |

As shown by the table hereinabove, the results indicate that all hydrocolloids are not equivalent and only certain hydrocolloids could be utilized in the high solid confectionery of the present invention. The results were not consistent with predictable hydrocolloid functionality in lower solids systems (below 80% solids).

Both low methoxy (LM) pectin and gelatin (at the lower level used) produced a flowable non-gelled product. At higher levels of gelatin (see sample 3, Table 1), a non-flowable solid was obtained but the texture was extremely elastic and was similar to chewing gum. This product required extensive chewing and took a long time (minutes) to clear the mouth. Also, carob bean gum and combinations of gelatin/carob meal at various concentration levels used in U.S. Pat. No. 3,867,560 produced grainy, pulpy precipitates which were non-solid and flowed with time. The texture was discontinuous and unacceptable. Furthermore, certain patterns emerged with the gums which were tried, such that the sulfated hydrocolloids yielded gelled textures with the best sensory and gel characteristics. Therefore, kappa-carrageenan and iota-carrageenan, both of which are specifically listed in the present invention, produce acceptable products. Lambda-carrageenan appears to be too sulfated to produce a gelled texture and is also not considered a gel former in high Aw systems for that reason. Gellan gum also yields very acceptable gels. Agar also produced an acceptable gel. Xanthan, guar and gum arabic produced a very soft solid that was unacceptable at this concentration.

Therefore, these experiments clearly illustrate that the various hydrocolloids behave differently at the specific water activity and water moisture content required for the products of the present invention. The choice of the particular hydrocolloid is not trivial since only a select few exhibit the proper functionality in our system.

The use of the specifically identified hydrocolloids of the present invention in systems having a water activity below 0.65 and a moisture content of 10–20% yields products that have good flavor and texture because a quick-setting solid non-flowable product is produced.

For purpose of comparison, the following comparative examples were conducted.

COMPARATIVE EXAMPLES 1–8

The procedure of Examples 1 and 2 of U.S. Pat. No. 4,637,937 to Terada et al. were repeated. In addition, variations were conducted in which various hydrocolloids were substituted for the hydrocolloids described in Examples 1 of Terada, et al. The water activity of each of these examples were measured, and the product characteristics were noted. The results of the Terada et al. experiments and the variations thereof are indicated in Table 2:

TABLE 2

| Patent Example | Hydrocolloid Used | Concentration | Aw | Comments |
|---|---|---|---|---|
| 1-Terada: Ex. 1 | Caseinate/MCC | 0.6/0.09 | 0.883 | rich, creamy, chocolate-like |
| 2-Variation of 1 | Caseinate | 0.68 | 0.976 | math, creamy |
| 3-Variation of 1 | Caseinate/Med. Starch | 0.7/8.6 | 0.953 | firm, hard, powdery |
| 4-Variation of 1 | Caseinate/Med. Starch | 0.7/10.5 | 0.942 | rich, creamy, firm |
| 5-Variation of 1 | Caseinate/MCC/Med. Starch | 0.6/0.7/3.4 | 0.907 | firm, viscous emulsion |
| 6-Variation of 1 | Caseinate/MCC/Med. Starch | 0.5/0.6/0.6 | 0.890 | very firm emulsion |
| 7-Variation of 1 | Caseinate/MCC | 0.6/0.1 | 0.953 | chocolate-like, creamy |
| 8-Terada: Ex. 2 | Caseinate/MCC | 0.6/0.1 | 0.937 | no set, flowable |

The water activity of all the Examples measured 0.88 or above. The lowest Aw measurement among these samples resulted when fructose (a monosaccharide which is known to depress Aw greater than sucrose, a disaccharide) was substituted for sucrose. Upon these findings, it is apparent that the products in Terada, et al. are clearly above the 0.65 Aw limit. Thus, the products therein have such a high water activity that they need to be refrigerated to avoid microbial spoilage if stored for any length of time.

COMPARATIVE EXAMPLES 9–11

U.S. Pat. No. 3,867,560 to Menzi, et al. also defines a food system which contains some hydrocolloids. Menzi, et al. also do not discuss total solids in combination with Aw, but only teach a water content between 4–25% (i.e. total solids content of 75–96%). Example #7 of Menzi, et al. was run, in accordance with the formula and procedure described therein, but an extrudable paste as taught by Menzi, et al. could not be prepared due to an inability to hydrate the dry ingredients. As a result, a non-homogeneous mix of dry powder was obtained. Based on the formula and procedure given, it follows that Examples 1–6 of Menzi, et al. would yield very similar results. The final product obtained is not a homogeneous, non-flowing solid but a flowing mixture of granular powders which is impractical to form into an enrobable or "stand-alone" confectionery product as can be made by the present invention.

The procedure in Example 7 of Menzi, et al. was modified to allow water addition until a workable paste could be obtained, i.e. a product as described by Menzi, et al. This required an equal amount of water (500 grams) to be added to the entire batch weight (500 grams). The modification resulted in a workable paste that could be processed as described, however, the final water activity was measured at 0.931 and is too high to support a shelf-stable confection or fall within the Aw range achieved by the present invention. Example 10 of Menzi, et al. was prepared and had a measured Aw of 0.69. This too falls outside of the Aw range achieved by the present invention. The product was a non-homogeneous, granola-like product that could be molded into shapes but differed greatly from the moldable, homogeneous, non-flowable solid products of the present invention.

COMPARATIVE EXAMPLE 12

U.S. Pat. No. 4,710,393 to Holmgren, et al. describe a confectionery system with low water activity (0.2–0.5) in combination with total moisture of 4–10% or 90–96% total solids. No mention is made of the use of any hydrocolloids in the Holmgren, et al. system. In order to demonstrate the criticality of maintaining the proper water activity and moisture content in combination with the specific hydrocolloids recited in the present invention, gellan, carrageenan and furcellarin were added to the Holmgren, et al. example as described hereinbelow.

The Holmgren, et al. example described therein was prepared exactly as described in the patent in duplicate. Both attempts resulted in products that contained a large amount of browned precipitate with a very discontinuous and unacceptable texture for a caramel product.

COMPARATIVE EXAMPLE 13

The Holmgren example was prepared exactly as described except the mixture was cooked for ten minutes under vacuum in a scraped surface vacuum kettle. The product was then cooked atmospherically an additional 3–5 minutes to reach 254° F.

COMPARATIVE EXAMPLES 14–16

Samples were prepared as in experiment 13; however, 0.25% carrageenan (tradename GELCARIN® GP 812), 0.25% furcellarin (tradename TIC COLLOID 600) or 0.5% gellan (tradename KELCOGEL®) were added to the system in the fat blend prior to cook.

The following results were obtained from comparative Experiments 12–16:

| Comparative Experiment | Hydrocolloid Used | Measured Level in % | Aw | Comments |
|---|---|---|---|---|
| 12 | None | None | 0.413 | ppt present |
| 13 | None | None | 0.201 | semi-glassy hard, non-spreadable, chewy, sticky |

| Compartive Experiment | Hydrocolloid Used | Measured Level in % | Aw | Comments |
|---|---|---|---|---|
| 14 | Carrageenan | 0.25 | 0.272 | semi-glassy hard, non-spreadable, chewy, sticky |
| 15 | Furcellarin | 0.25 | 0.240 | semi-glassy hard, non-spreadable, chewy, sticky |
| 16 | Gellan | 0.50 | 0.232 | semi-glassy hard, non-spreadable, chewy, sticky |

As described above, the formula and procedure for Comparative Examples 12–16 were followed as described in Holmgren, et al. It did not yield an acceptable, homogeneous product. The products obtained from the modified procedures of Comparative Examples 13–16 were very hard and had glassy textures that differed greatly from the soft chewy textures achievable with the present invention. The hard texture is most likely due to the low moisture content of these products (below 10% as described by Holmgren, et al.). It apparently renders the hydrocolloids non-functional since there is no textual differences between products produced in comparative experiments 13–16.

The above experiments illustrate that in order to maintain the functionality of the hydrocolloids, it is important to maintain both a water activity below 0.65 and a moisture content between 10–20%.

The above preferred embodiments and examples are given to illustrate the scope and spirit of the present invention. These embodiments and examples will make apparent to those skilled in the art other embodiments and examples. These other embodiments and examples are within the contemplation of the present invention. Therefore, the present invention should be limited only by the appended claims.

What is claimed is:

1. A water and sugar based high solids confectionery having good flavor and texture comprising (a) at least 80% to 90% total solids, by weight wherein the carbohydrate content is at least 70% by weight of the total solids, (b) a cation containing edible material selected from the group consisting of dairy products, cocoa, fruit juice, fruit solids, edible salts of organic and inorganic acids and mixtures thereof, (c) a cationic and thermosensitive hydrocolloid being present in sufficient quantities to form a thermoreversible gel with said cation edible matter and (d) up to 7% fat by weight, said confectionery having a water activity below 0.65 and a pH from 3.0 to 8.5.

2. The confectionery of claim 1 in which the carbohydrate is mono, di or polysaccharide, sugar alcohols or mixtures thereof.

3. The confectionery of claim 1 wherein the pH is from 5.5 to 8.5 and the water activity is 0.35 to 0.65 Aw.

4. The confectionery of claim 1 in which the hydrocolloid is carrageenan.

5. The confectionery of claim 4 wherein the carrageenan is kappa carrageenan.

6. The confectionery of claim 4 wherein the carrageenan is iota carrageenan.

7. The confectionery of claim 4 wherein the carrageenan is a mixture of kappa carrageenan, iota carrageenan and lambda carrageenan.

8. The confectionery of claim 1 wherein the thermosensitive hydrocolloid is furcellaran.

9. The confectionery of claim 1 wherein the thermosensitive hydrocolloid is agar.

10. The confectionery of claim 1 in which the thermosensitive hydrocolloid is gellan gum.

11. The confectionery of claim 4 wherein the carrageenan is present in amounts ranging from 0.25% to 3.5% by weight.

12. The confectionery of claim 10 wherein the gellan gum is present in amounts ranging from 0.5% to 5% by weight.

13. The confectionery product of claim 8 wherein the furcellaran is present in amounts ranging from 0.25% to 3.5% by weight.

14. A low calorie and low fat confectionery of claim 1 in which the confectionery comprises a cation containing edible material, a cationic and thermosensitive hydrocolloid, at least 84% to 89% total solids by weight, the carbohydrate comprises up to 40% by weight low calorie bulking agent selected from the group consisting of polydextrose, sugar alcohols, cellulose, and gums and at least 30% monosaccharides, the pH is from 5.5 to 8.5 and the water activity is 0.30 to 0.65.

15. A low calorie and low fat confectionery of claim 14 in which fructose comprises at least 30% by weight of the carbohydrates.

16. A caramel confectionery of claim 14 in which the cation containing material comprises milk products, and the fat content is below 5% by weight.

17. A chocolate confectionery of claim 14 in which the cation containing material comprises cocoa, and the fat content is below 5% by weight.

18. The confectionery of claim 14 in which the hydrocolloid is carrageenan, gellan, furcellaran, agar or mixtures thereof, and fructose comprise at least 30% of the carbohydrates.

19. The confectionery of claim 18 wherein the hydrocolloid is carrageenan, gellan, furcellaran or mixtures thereof.

20. The confectionery of claim 18 in which the hydrocolloid comprises carrageenan.

21. The confectionery of claim 20 in which the carrageenan is kappa carrageenan.

22. The confectionery of claim 20 in which the carrageenan is iota carrageenan.

23. The confectionery of claim 20 in which the carrageenan is a mixture of kappa carrageenan, iota carrageenan and lambda carrageenan.

24. The confectionery of claim 16 in which the fat content is up to 4%.

25. A method of preparing a low fat, high solids confection comprising:

a) mixing and heating water with a cationic reactive and thermosensitive hydrocolloid present in sufficient quantities to form a thermoreversible gel with a cation containing edible material when added thereto, said water being present in sufficient quantities to disperse said hydrocolloid;

b) mixing the mixture of (a) with fat present in amounts of less than 7% by weight, solids comprising carbohydrates and with a cation containing edible material selected from the group consisting of milk products, cocoa, fruit solids and edible salts of organic and inorganic acids and mixtures thereof;

c) heat treating the mixture of (b) to develop flavor and to adjust the solids content of the mixture to at least 80% to 90% total solids by weight and the carbohydrate content to at least 70% by weight of the total solids;

d) cooling the mixture to cause solidification of the mixture to yield a softness, flavor and texture mimicking a full, fat equivalent confection, said confectionery having a water activity below 0.65 Aw and a pH from 3.0 to 8.5.

26. The method of claim 25 in which the fat content is less than 5% and the pH is from 5.5 to 8.5.

27. The method of claim 25 in which the confectionery contains milk solids, 0% to 4% fat and the hydrocolloid is carrageenan.

28. The method of claim 25 in which the confectionery comprises 84 to 89% total solids and the cation containing edible material is cocoa and the fat content is 0 to 4%.

29. The method of claim 25 in which the hydrocolloid is carrageenan.

30. The method of claim 25 in which the hydrocolloid is gellan gum.

31. The method of claim 25 in which the hydrocolloid is furcellaran.

32. The method of claim 25 in which the thermosensitive hydrocolloid is agar.

33. The method of claim 29 in which the carrageenan is kappa carrageenan.

34. The method of claim 29 in which the carrageenan is iota carrageenan.

35. The method of claim 29 in which the carrageenan is a mixture of kappa carrageenan, iota carrageenan and lambda carrageenan.

36. A low or no fat, reduced calorie high solids confectionery comprising (a) at least 80% to 90% solids by weight wherein the carbohydrate content is at least 70% by weight of the total solids and wherein the carbohydrate comprises from 10% to 40% by weight low calorie bulking agent and at least 30% monosaccharides; (b) a cationic reactive and thermosensitive hydrocolloid being present in sufficient quantities to form a thermoreversible gel with the cation containing edible material; (c) a cation containing edible material; and (d) fat in amounts less than 5% by weight, said confectionery having a water activity of 0.3 to 0.65 Aw and a pH from 3.0 to 8.5.

37. The reduced calorie confectionery of claim 36 wherein the pH is 5.5–8.5.

38. The reduced caloric confectionery of claim 36 wherein the pH is 3.0 to 5.5.

39. The confectionery of claim 1 wherein the water activity is 0.30 to 0.45, inclusive.

40. The confectionery of claim 14 wherein the water activity is 0.30 to 0.45, inclusive.

41. The confectionary of claim 39 additionally comprising a wafer.

42. The confectionery of claim 40 additionally comprising a wafer.

43. The chocolate confectionery of claim 17 having a water activity of 0.30 to 0.45, inclusive.

44. The chocolate confectionery of claim 41 which additionally comprises a wafer.

\* \* \* \* \*